US010635872B2

(12) United States Patent
Chiba et al.

(10) Patent No.: US 10,635,872 B2
(45) Date of Patent: Apr. 28, 2020

(54) PORTABLE TERMINAL

(71) Applicant: CASIO COMPUTER CO., LTD., Shibuya-ku, Tokyo (JP)

(72) Inventors: Yasunori Chiba, Tachikawa (JP); Satoshi Ogasawara, Akishima (JP); Shinya Okumura, Kusatsu (JP); Yoshiaki Mochizuki, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/039,583

(22) Filed: Jul. 19, 2018

(65) Prior Publication Data
US 2019/0026518 A1    Jan. 24, 2019

(30) Foreign Application Priority Data
Jul. 20, 2017   (JP) .................................. 2017-141288

(51) Int. Cl.
*G06K 7/10*   (2006.01)
*G06K 7/14*   (2006.01)

(52) U.S. Cl.
CPC ..... *G06K 7/10881* (2013.01); *G06K 7/10554* (2013.01); *G06K 7/1413* (2013.01); *G06K 2007/10524* (2013.01)

(58) Field of Classification Search
CPC ..... G06K 7/10881; G06K 2007/10524; G06K 7/10554; G06K 7/1413; G06F 15/0216
See application file for complete search history.

(56) References Cited

U.S. PATENT DOCUMENTS 5,477,043 A    12/1995   Dvorkis
5,801,918 A *  9/1998   Ahearn .............. G06K 7/10881
                                              235/472.01
(Continued)

FOREIGN PATENT DOCUMENTS

CN    101887953 A    11/2010
JP    H10112891 A     4/1998
(Continued)

OTHER PUBLICATIONS

Office Action (Non-Final Rejection) dated Feb. 27, 2019 issued in U.S. Appl. No. 16/039,528.
(Continued)

*Primary Examiner* — Seung H Lee
(74) *Attorney, Agent, or Firm* — Holtz, Holtz & Volek PC

(57) ABSTRACT

A portable terminal including a grip section capable of being gripped by a hand of a user in a predetermined gripping style, a first switch section provided such that at least a pressing target portion is exposed from a first surface of a terminal main body and capable of being operated by an index finger of the hand of the user gripping the grip section in the gripping style, and a second switch section provided such that at least a pressing target portion is exposed from a second surface of the terminal main body positioned opposite to the first surface and capable of being operated by a thumb of the gripping hand of the user in the gripping style, in which the pressing target portion of the first switch section is set to require operating force greater than operating force required for the pressing target portion of the second switch section.

20 Claims, 10 Drawing Sheets

(56) References Cited

U.S. PATENT DOCUMENTS

| | | | |
|---|---|---|---|
| 6,637,662 B2 | 10/2003 | Itou et al. | |
| 7,450,968 B2* | 11/2008 | Jung | H04M 1/0237 |
| | | | 455/566 |
| 7,775,438 B2* | 8/2010 | Beckhusen | G06F 1/1626 |
| | | | 235/462.43 |
| 7,839,632 B2 | 11/2010 | Matsui et al. | |
| 8,254,114 B2 | 8/2012 | Lin | |
| 8,730,155 B2 | 5/2014 | Araki et al. | |
| 8,814,049 B2 | 8/2014 | Lee et al. | |
| 2002/0023961 A1 | 2/2002 | Itou et al. | |
| 2008/0084654 A1 | 4/2008 | Gerich | |
| 2009/0002926 A1 | 1/2009 | Matsui et al. | |
| 2010/0290177 A1 | 11/2010 | Lin | |
| 2010/0302140 A1 | 12/2010 | Araki et al. | |
| 2012/0088547 A1 | 4/2012 | Lee et al. | |
| 2014/0014726 A1* | 1/2014 | Tsiopanos | G06K 7/0004 |
| | | | 235/470 |
| 2016/0064874 A1 | 3/2016 | Meguro et al. | |
| 2018/0084654 A1 | 3/2018 | Meguro et al. | |
| 2018/0217638 A1 | 8/2018 | Ohtaka et al. | |
| 2019/0082041 A1 | 3/2019 | Chiba | |

FOREIGN PATENT DOCUMENTS

| | | |
|---|---|---|
| JP | H11203394 A | 7/1999 |
| JP | 2001060999 A | 3/2001 |
| JP | 2002074261 A | 3/2002 |
| JP | 2003030602 A | 1/2003 |
| JP | 2004252600 A | 9/2004 |
| JP | 2004322661 A | 11/2004 |
| JP | 2005027335 A | 1/2005 |
| JP | 2009009196 A | 1/2009 |
| JP | 2009282761 A | 12/2009 |
| JP | 2010277508 A | 12/2010 |
| JP | 2011107824 A | 6/2011 |
| JP | 2012027923 A | 2/2012 |
| JP | 2012130025 A | 7/2012 |
| JP | 2013156752 A | 8/2013 |
| JP | 2014085684 A | 5/2014 |

OTHER PUBLICATIONS

Office Action (Non-Final Rejection) dated Mar. 1, 2019 issued in U.S. Appl. No. 16/039,603.
Related U.S. Appl. No. 16/039,528; First Named Inventor: Yasunori Chiba; Title: "Portable Terminal"; Filed: Jul. 19, 2018.
Related U.S. Appl. No. 16/039,550; First Named Inventor: Yasunori Chiba; Title: "Portable Terminal, Imaging Device and Reading Device"; Filed: Jul. 19, 2018.
Related U.S. Appl. No. 16/039,603; First Named Inventor: Yasunori Chiba; Title: "Portable Terminal, Imaging Device and Reading Device"; Filed: Jul. 19, 2018.
Office Action (Non-Final Rejection) dated Apr. 12, 2019 issued in U.S. Appl. No. 16/039,550.
Office Action (Final Rejection) dated Jul. 18, 2019 issued in U.S. Appl. No. 16/039,603.
Notice of Allowance dated Aug. 19, 2019 issued in U.S. Appl. No. 16/039,550.
Japanese Office Action dated Sep. 3, 2019 (and English translation thereof) issued in Japanese Application No. 2017-141288.
U.S. Appl. No. 16/039,528, filed Jul. 19, 2018.
U.S. Appl. No. 16/039,550, filed Jul. 19, 2018.
U.S. Appl. No. 16/039,603, filed Jul. 19, 2018.

* cited by examiner

PORTABLE TERMINAL

CROSS-REFERENCE TO RELATED APPLICATION

This application is based upon and claims the benefit of priority from the prior Japanese Patent Application No. 2017-141288, filed Jul. 20, 2017, the entire contents of which are incorporated herein by reference.

BACKGROUND OF THE INVENTION

1. Field of the Invention

The present invention relates to a handheld portable terminal.

2. Description of the Related Art

For example, a handheld portable terminal is known which has a structure where the lower surface of a device case is formed to have a curved shape and a finger rest projected portion is provided on the lower surface of the device case so that the device case can be gripped by one hand with the thumb of a holding hand of a user being placed on the upper surface of the device case, the other fingers being placed on the lower surface of the device case, and the index finger being hooked on the finger rest projected portion, as described in Japanese Patent Application Laid-Open (Kokai) Publication No, 10-112891.

That is, the portable terminal of this type is structured as follows. The device case is gripped by one hand with the thumb being placed on an operation section provided on the upper surface of the device case and the other fingers being placed on the lower surface of the device case, and the index finger is hooked on the finger rest projected portion provided on the lower surface of the device case as if it is hooked on the trigger of a pistol, so that the operation section on the upper surface is operated by the thumb and a lower surface switch provided on the finger rest projected portion on the lower surface is subjected to a key operation by the index finger.

SUMMARY OF THE INVENTION

In accordance with one aspect of the present invention, there is provided a portable terminal comprising a grip section capable of being gripped by a hand of a user in a predetermined gripping style: a first switch section provided such that at least a pressing target portion is exposed from a first surface of a terminal main body and capable of being operated by an index finger of the hand of the user gripping the grip section in the gripping style; and a second switch section provided such that at least a pressing target portion is exposed from a second surface of the terminal main body positioned opposite to the first surface and capable of being operated by a thumb of the gripping hand of the user in the gripping style, wherein the pressing target portion of the first switch section is set to require operating force greater than operating force required for the pressing target portion of the second switch section.

In accordance with another aspect of the present invention, there is provided a portable terminal having side switches provided on both sides of a terminal main body such that at least a pressing target portion of each of the side switches is exposed from a side surface of the terminal main body, comprising: a grip section capable of being gripped by one hand of a user in a gripping style where the user places a thumb of the one hand on a front surface of the terminal main body and holds a rear surface of the terminal main body by at least an index finger and a middle finger extended from a side of the terminal main body; and a lower surface switch section provided such that a pressing target portion is exposed from the rear surface and capable of being operated by the index finger of the one hand in the gripping style, wherein the pressing target portion of the lower surface switch section is set to require operating force greater than operating force required for the pressing target portion of each of the side switches.

In accordance with another aspect of the present invention, there is provided a portable terminal having a plurality of front surface switches provided on a front surface of a terminal main body such that at least a pressing target portion of each of the front surface switches is exposed from the front surface of the terminal main body, comprising: a grip section capable of being gripped by one hand of a user in a gripping style where the user places a thumb of the one hand on a front surface of the terminal main body and holds a rear surface of the terminal main body by at least an index finger and a middle finger extended from a side of the terminal main body; and a lower surface switch section provided such that a pressing target portion is exposed from the rear surface and capable of being operated by the index finger of the one hand in the gripping style, wherein the pressing target portion of the lower surface switch section is set to require operating force greater than operating force required for the pressing target portion of each of the plurality of front surface switches.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment of a portable terminal to which the present invention has been applied will hereinafter be described with reference to FIG. 1 to FIG. 10.

This portable terminal includes a device case 1 as a terminal main body, as shown in FIG. 1 to FIG. 4. This device case 1 is formed to have a substantially rectangular shape elongated in a longitudinal direction that is a length direction (portrait orientation in FIG. 1).

Figure 1:
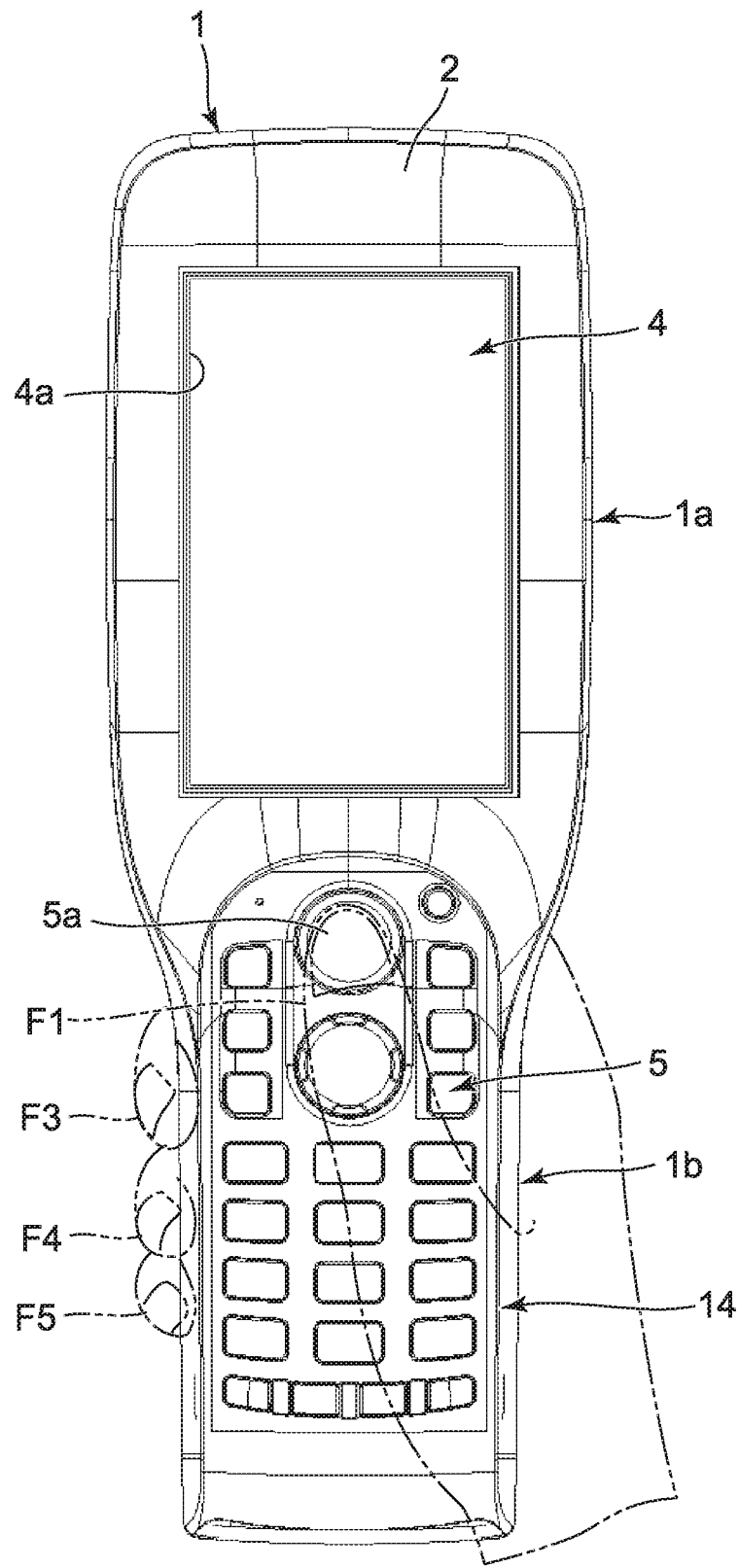
FIG. 1 is a front view of an embodiment in which the present invention has been applied to a portable terminal.

This device case 1 is formed to have its substantially half on an upper side as a broad portion 1a, have the remaining half on a lower side as a narrow portion 1b, and have a substantially Japanese battledore shape as a whole, as shown in FIG. 1 to FIG. 4, That is, the broad portion 1a on the upper side is formed so as to have a length (width) in a lateral direction (landscape orientation in FIG. 1) orthogonal to its longitudinal direction longer (wider) than the length (width) of the narrow section 1b on the lower side in the lateral direction (landscape orientation in FIG. 1).

Figure 2:
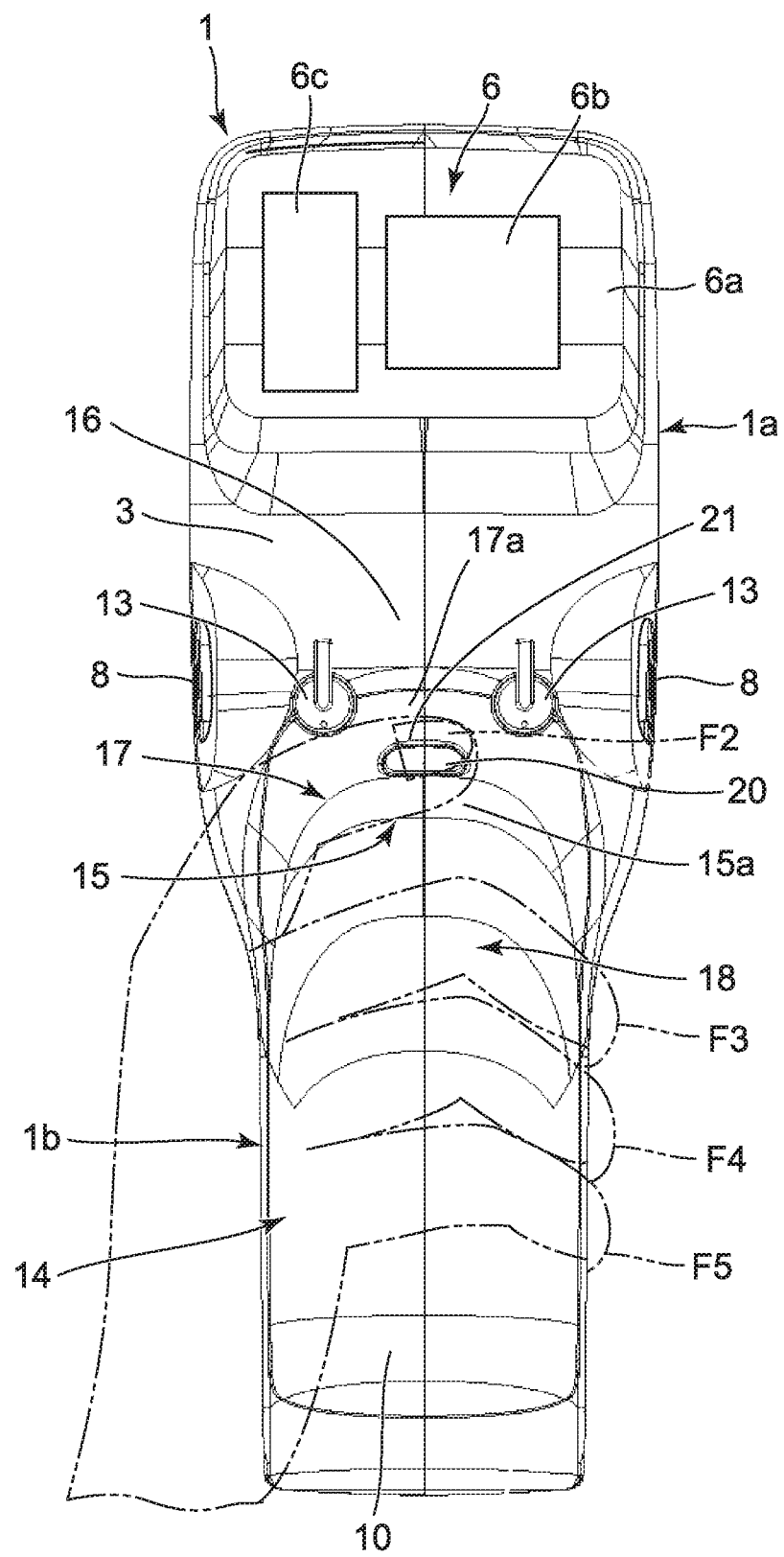
FIG. 2 is a rear view of the portable terminal shown in FIG.
Figure 3:
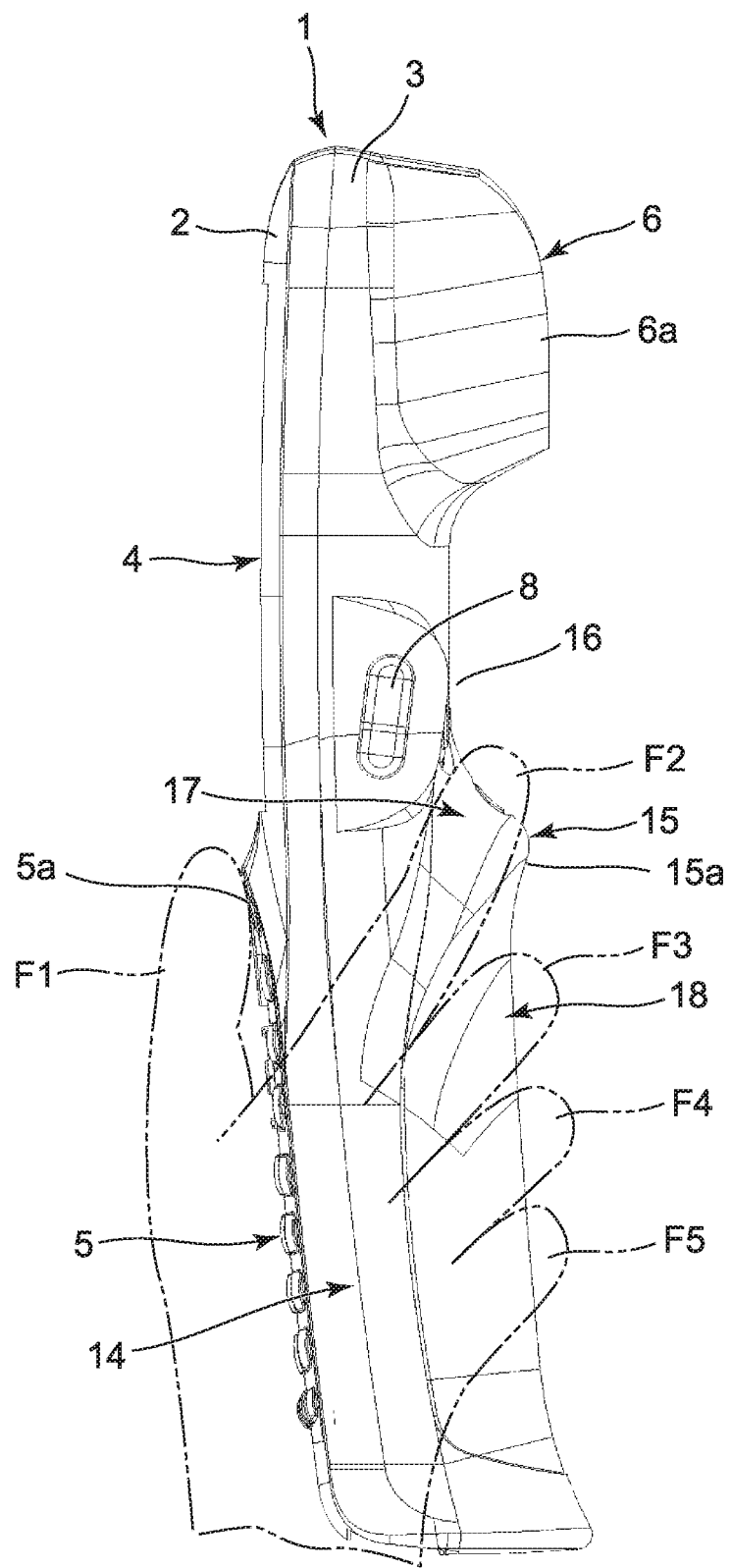
FIG. 3 is a left side view of the portable terminal shown in FIG. 2.

Also, this device case 1 is structured to have an upper case 2 and a lower case 3 and have modules (not shown) incorporated therein, as shown in FIG. 1 to FIG. 5. The upper case 2 is structured to be formed, as with the device case 1, in a substantially Japanese battledore shape having a broad portion on the upper side and a narrow portion on the lower side and have a side surface portion of its outer edge attached to the lower case 3, as shown in FIG. 1 and FIG. 3.

Figure 5:
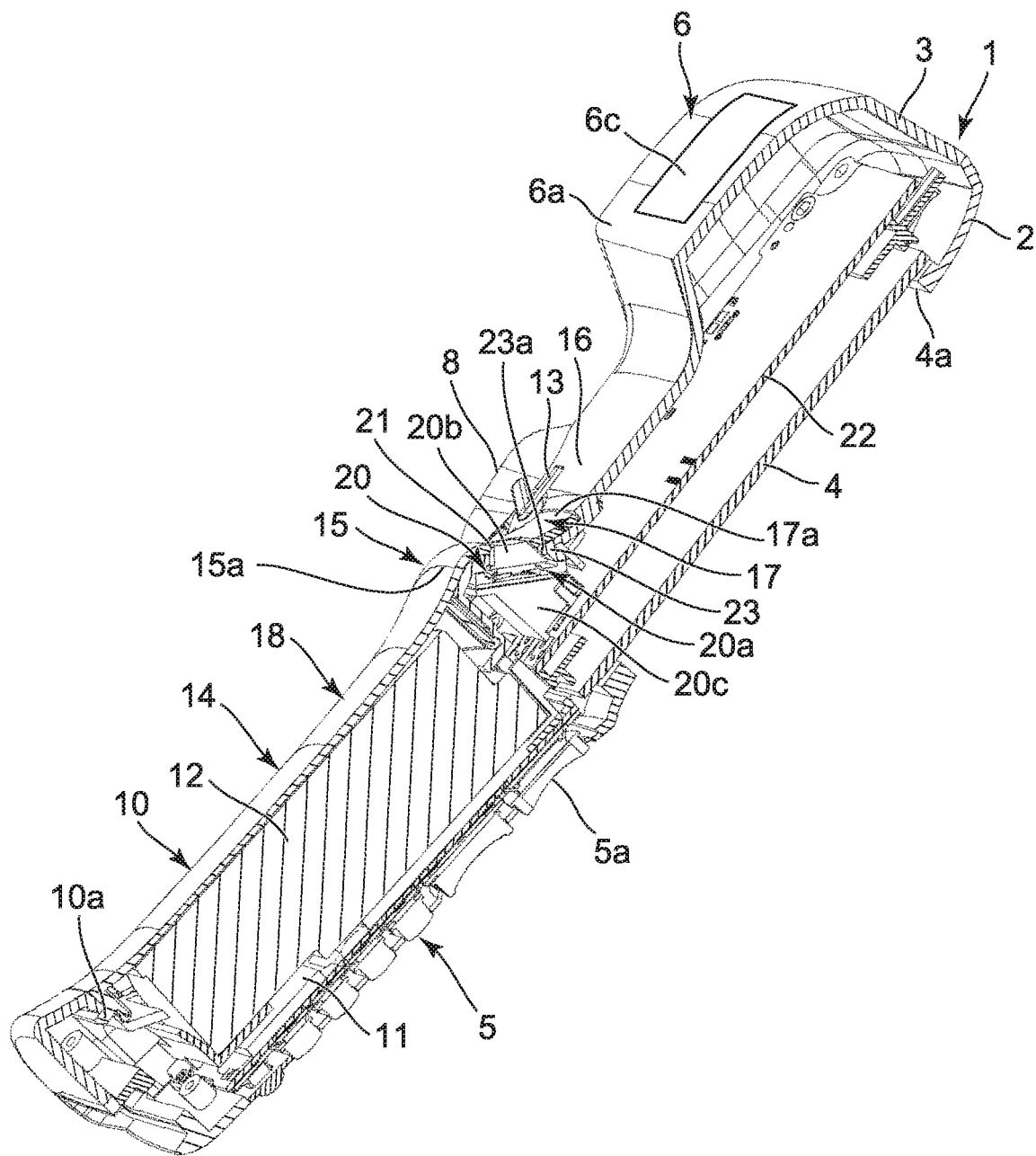
FIG. 5 is a perspective view showing a cross section of the portable terminal taken along line A-A in FIG. 4.
Figure 6:
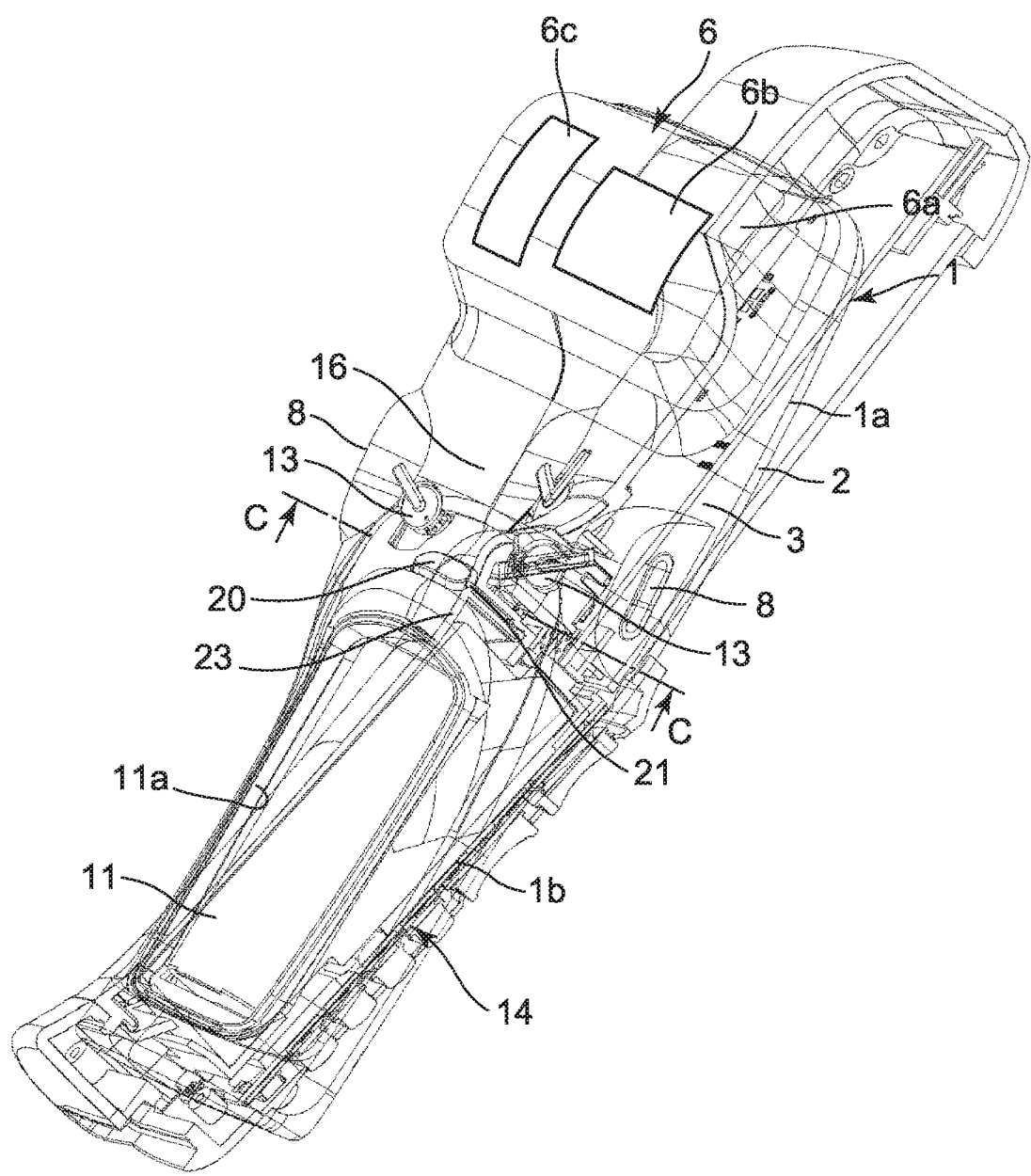
FIG. 6 is a perspective view of the portable terminal shown in FIG. 4, in which a battery cover has been removed.
Figure 7:
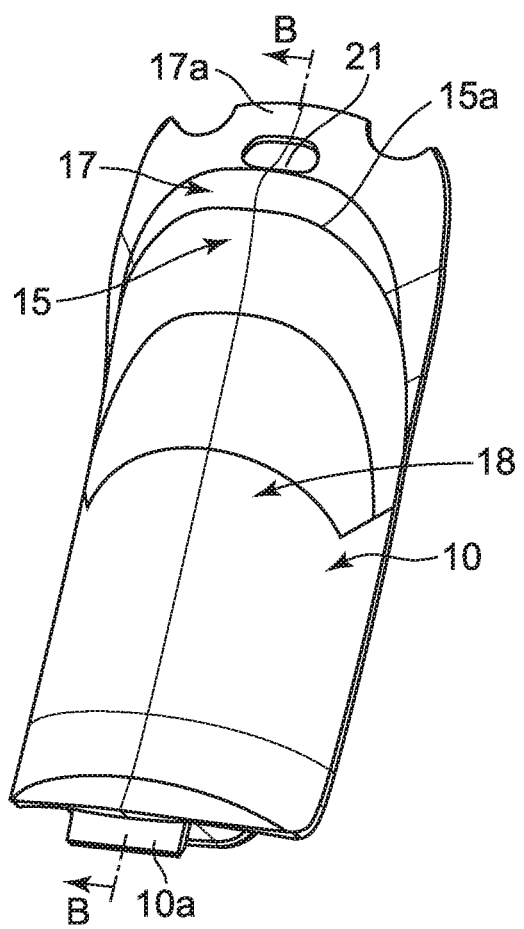
FIG. 7 is a perspective view of the battery cover of the portable terminal shown in FIG. 7.
Figure 8:
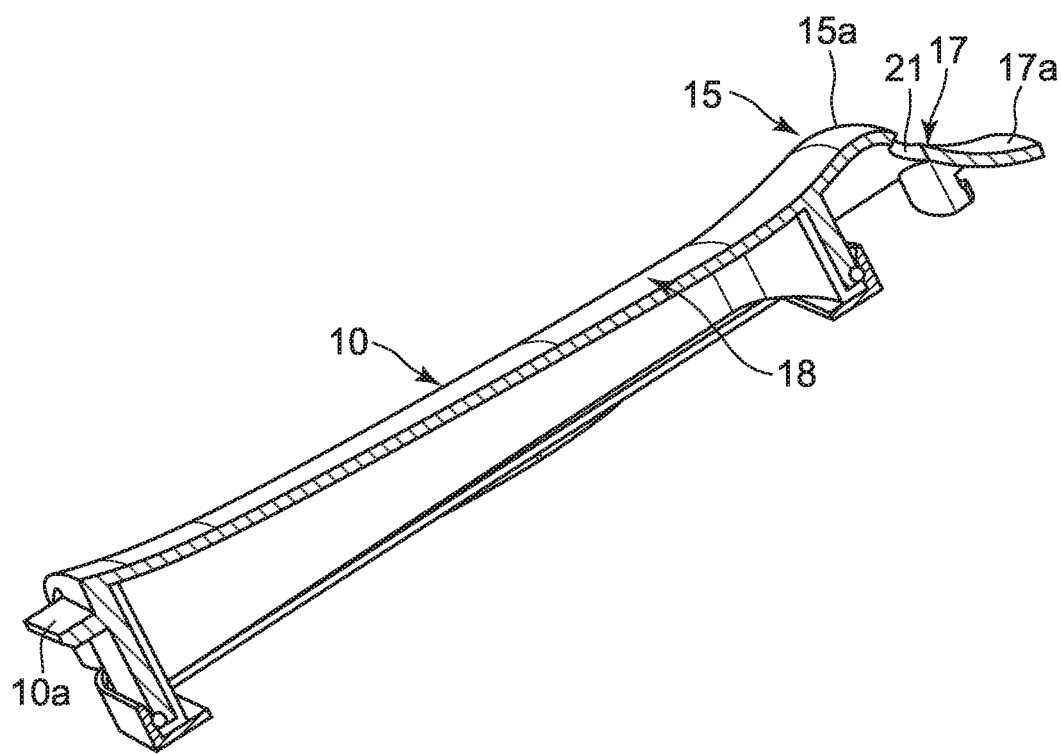
FIG. 8 is a perspective view of a cross section of the battery cover taken along line B-B in FIG. 7.

Also, on the broad portion on the upper side on the front surface that is the upper surface of the upper case 2, a display section 4 is provided over a substantially entire area, as shown in FIG. 1 and FIG. 5. Also, on the narrow portion on the lower side on the front surface of the upper case 2, a key operation section 5 is provided over a substantially entire area. The display section 4 is a display panel of a flat-surface type, such as a liquid-crystal display panel or EL (electroluminescence) display panel, and is formed to have a substantially rectangular shape.

This display section 4 is structured to be arranged in the upper case 2 so as to correspond to a display window section 4a provided on the front surface of the upper case 2, whereby information displayed on the display section 4 can be viewed from above the upper case 2 through the display window section 4a, as shown in FIG. 1 and FIG. 5. The key operation section 5 includes various keys required for the portable terminal, such as numeric keys, a cursor key, and function keys. In the present embodiment, the key operation section 5 has an upper surface trigger key 5a arranged on its upper middle area.

Figure 4:
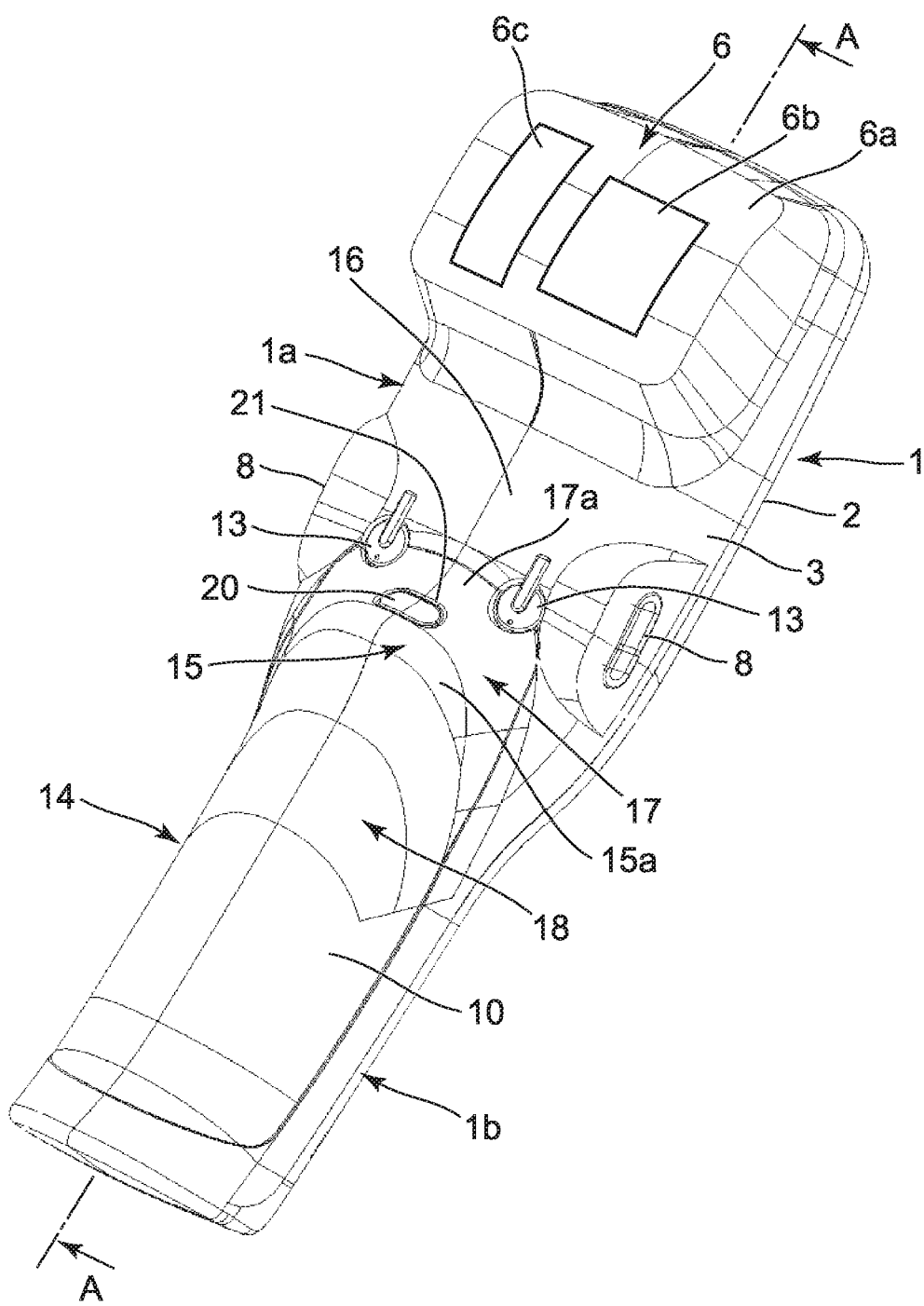
FIG. 4 is a rear perspective view of the portable terminal shown in FIG. 1.

The lower case 3 is structured to be formed, as with the upper case 2, in a substantially Japanese battledore shape having a broad portion on the upper side and a narrow portion on the lower side and have a side surface portion of its outer edge attached to the upper case 2, as shown in FIG. 2 to FIG. 4. An optical reading section 6 is provided on the rear surface as the lower surface of the broad portion positioned on the upper side of this lower case 3.

This optical reading section 6 includes a laser reading section and an imaging section (both are not shown), and these sections are stored in a read projection section 6a provided projecting in a box shape to the rear surface positioned on the upper side in the broad portion of the lower case 3, as shown in FIG. 2 to FIG. 5. In the present embodiment, the read projection section 6a is provided with a first window section 5b corresponding to the laser reading section and a second window section 6c corresponding to the imaging section.

The optical reading section 6 is structured such that the laser reading section emits a laser beam from the first window section 6b of the read projection section 6a to the outside of the device case 1 and receives a reflected light of the laser beam so as to read, for example, a barcode of an article, as shown in FIG. 2 to FIG. 5. Also, this optical reading section 6 is structured such that the imaging section captures, through the second window section 6c, an image of an article from which its barcode is to be read by the laser reading section.

Also, to substantially the midpoint of the device case in the longitudinal direction (length direction), that is, on both sides of the broad portion 1a positioned on a boundary side between the broad portion 1a and the narrow portion 1b, side trigger keys 8 are provided, as shown in FIG. 1 to FIG. 5. These side trigger keys 8 and the upper surface trigger key 5a of the key operation section 5 are to cause a reading operation by the optical reading section 6 to be performed.

Furthermore, on the narrow portion 1b positioned on the lower side of this device case 1, a battery accommodating section 11 to be covered by a battery cover 10 is provided so as to correspond to the key operation section 5, as shown in FIG. 2 to FIG. 6. This battery accommodating section 11 is to accommodate a rechargeable battery 12, is provided, inside the narrow portion 1b of the device case 1 so as to correspond to the key operation section 5 provided on the narrow portion 1b of the device case 1, and is open to the back surface side by an opening 11a provided on the rear surface of the device case 1.

Also, on the rear surface of the lower case 3 positioned between the battery accommodating section. 11 and the optical reading section 6, a pair of attachment levers 13 is provided to removably attach the battery cover 10 which openably covers the battery accommodating section 11 to the lower case 3, as shown in FIG. 2 and FIG. 4. That is, the pair of attachment levers 13 is provided near the side trigger keys 8 provided on both sides of the device case 1. The pair of these attachment levers 13 is structured to be rotated to removably engage the edge on the upper side of the battery cover 10 with the rear surface of the lower case 3.

As a result, the battery cover 10 is structured to be attached to the rear surface of the lower case 3 by the edge on the upper side being engaged with the lower case 3 by the pair of attachment levers 13, with it extending across a lower surface trigger key 20 described further below from the lower side of the battery accommodating section 11 and openably covering the opening 11a of the battery accommodating section 11, as shown in FIG. 2, FIG. 4 and FIG. 5. Also, a fulcrum projection portion 10a is provided at the end on the lower side of the battery cover 10. The battery cover 10 is structured to open and close the battery accommodating section 11 by rotating this fulcrum projection portion 10a as a fulcrum.

On the narrow portion 1b positioned on the lower side of the device case 1, a grip section 14 is provided so as to be gripped by one hand of the user, across the front surface of the device case 1 serving as a first surface and the rear surface positioned opposite thereto serving as a second surface, as shown in FIG. 1 to FIG. 4. This grip section 14 is structured be gripped by one hand of the user in a gripping style where the thumb F1 of one hand of the user is placed on the front surface of the device case 1 and the rear surface of the device case 1 is held by other fingers F2 to F5 extended from the side of the device case 1.

That is, this grip section. 14 is constituted by the narrow portion 1b of the device case 1 including the narrow portion of the upper case 2 and the narrow portion of the lower case 3, and the battery cover 10 of the lower case 3, as shown in FIG. 1 to FIG. 4. In the present embodiment, each of sides of the narrow portion of the upper case 2 and the narrow portion of the lower case 3 in the grip section 14 is formed in an arc-shaped curved surface which makes the hand of the user gripping the grip section 14 in the above-described gripping style naturally curved. Also, the battery cover 10 of the lower case 3 is formed in a curved shape projecting so as to be mildly curved from both sides of the lower case 3 toward the rear surface side.

As a result, the grip section 14 has a shape by which the other fingers F2 to F5 are naturally flexed and placed around the rear surface of the device case 1, in the gripping style where the user places the thumb F1 on the front surface of the device case 1 so as to operate the key operation section 5 by the thumb F1 and holds the rear surface of the device case 1 by the other fingers F2 to F5 extended from the side of the device case 1, as shown in FIG. 1 to FIG. 4.

That is, the grip section 14 is formed in a shape that can be easily gripped by one hand irrespective of the size of the hand of the user, by the gripping hand of the user fitting thereto when the user holds the device case 1 by one hand in the gripping style where the user places the thumb F1 on the front surface of the device case 1 so as to operate the key operation section 5 by the thumb F1 and holds the rear surface of the device case 1 by the other fingers F2 to F5 extended from the side of the device case 1, as shown in FIG. 1 to FIG. 4.

Also, in this grip section 14, the battery cover 10 positioned on the rear surface is provided with a raised portion 15 as shown in FIG. 2 to FIG. 5. The raised portion 15 is raised to have a bulging shape between the index finger F2 and the middle finger F3 of the gripping hand of the user when the user holds the device case 1 by one hand in the gripping style where the user places the thumb F1 on the front surface of the device case 1 and holds the rear surface of the device case 1 by the other fingers F2 to F5 extended from the side of the device case 1.

Also, on the rear surface of the device case 1, a recessed portion 16 is provided so as to be recessed between the grip section 14 and the upper side of the device case 1 positioned in an extended area of this grip section 14, as shown in FIG. 2 to FIG. 5. That is, this recessed portion 16 is provided so as to be recessed between the raised portion 15 of the battery cover 10 and the read projection section 6a of the optical reading section 6.

As a result, the recessed portion 16 is structured such that the index finger F2 of the hand of the user gripping the grip section 14 is placed on a sloped surface of the recessed portion 16 positioned on the grip section 14 side when the user holds the grip section 14 by one hand in the gripping style where the user places the thumb F1 on the front surface of the device case 1 so as to operate the key operation section 5 by the thumb F1 and holds the rear surface of the device case 1 by the other fingers F2 to F5 extended from the side of the device case 1, as shown in FIG. 2 to FIG. 5.

Also, the raised portion 15 has a V-shaped vertex portion 15a positioned between the index finger F2 and the middle finger F3 of the gripping hand of the user when the user holds the grip section 14 by one hand in the gripping style where the user places the thumb F1 on the front surface of the device case 1 so as to operate the key operation section 5 by the thumb F1 and holds the rear surface of the device case 1 by the other fingers F2 to F5 extended from the side of the device case 1, as shown in FIG. 2 to FIG. 5. This vertex portion 15a is formed to be positioned between the index finger F2 and the middle finger F3 of the gripping hand of the user so as to be contiguous in a curved shape along a bent shape of the index finger F2 and the middle finger F3.

That is, this vertex portion 15a is formed so as to be contiguous in a curved shape along the bent shape of the index finger F2 and the middle finger F3 in a lateral direction orthogonal to the length direction of the device case 1 so that a contiguous middle portion in the lateral direction projects most toward the rear surface side of the device case 1 and the projection length gradually decreases from the middle portion in the lateral direction toward the both sides in the lateral direction, as shown in FIG. 2 to FIG. 5. Also, this raised portion 15 includes a first finger rest area 17 as one tail of the vertex portion 15a and a second finger rest area 18 as the other tail of the vertex portion 15a.

The first finger rest area 17 is a sloped surface onto which the index finger F2 is pressed when the user grips the grip section 14 in the above-described gripping style, and is formed as a steep sloped surface from the upper side of the battery cover 10 toward the vertex portion 15a, as shown in FIG. 2 to FIG. 5. The second finger rest area 18 is a sloped surface onto which the middle finger F3 to the small finger F5 are pressed when the user grips the grip section 14 in the above-described gripping style, and is formed as a sloped surface mildly sloped from the vertex portion 15a toward the lower side of the battery cover 10.

That is, the first finder rest area 17 is formed as a sloped surface onto which the pulp of the index finger F2 of the hand of the user gripping the grip section 14 is pressed toward the lower side of the battery cover 10 in the longitudinal direction (length direction), that is, the hand of the user gripping the grip section 14 in the gripping style where the user places the thumb F1 on the key operation section 5 so as to operate the key operation section 5 by the thumb F1 and holds the rear surface of the device case 1 by the other fingers F2 to F5 extended from the side of the device case 1, as shown in FIG. 2 to FIG. 5.

This first finger rest area 17 is the sloped surface of the recessed portion 16 positioned on the grip section 14 side, and is formed as a sloped surface rising from the upper side positioned on the upper side of the battery cover 10 toward the vertex portion 15a at a steep angle, as shown in FIG. 2 to FIG. 5. Also, this first finger rest area 17 is curved in an arc shape corresponding to the bent state of the index finger F2 along the vertex portion 15a contiguous in the lateral direction orthogonal to the longitudinal direction (length direction) of the device case 1.

Accordingly, the raised portion 15 is structured such that the pulp of the index finger F2 of the user is pressed onto the first finger rest area 17 as the index finger F2 is in a shape being bent along the curve of the first finger rest area 17 and, in this state, the index finger F2 pulls the first finger rest area 17 toward the lower side of the device case 1 in the longitudinal direction, that is, toward the hand of the user gripping the grip section 14, when the user grips the grip section 14 in the gripping style where the user places the thumb F1 on the key operation section 5 and holds the rear surface of the device case 1 by the other fingers F2 to F5 extended from the side of the device case 1, as shown in FIG. 2 to FIG. 5.

On the other hand, the second finger rest area 18 is formed as a curved surface such that the pulp of each of the other fingers F3 to F5 of the hand of the user gripping the grip section 14 causes the battery cover 10 of the grip section 14 to be pressed toward the device case 1 and the middle finger F3 to the small finger F5 of the user are naturally flexed with them being aligned, when the user grips the grip section 14 in the gripping style where the user places the thumb F1 on the key operation section 5 so as to operate the key operation section 5 by the thumb F1 and holds the rear surface of the device case 1 by the other fingers F2 to F5 extended from the side of the device case 1, as shown in FIG. 2 to FIG. 5.

That is, this second finger rest area 18 is formed as a curved surface mildly sloped from the vertex portion 15a toward the lower side of the battery cover 10, as shown in FIG. 2 to FIG. 4. As a result, this second finger rest area 18 is formed in a mild curved shape with a convex toward the rear surface side of the device case 1 so that the fingers F3 to F5 other than the index finger F2 are aligned and naturally flexed, when the user grips the grip section 14 in the gripping style where the user places the thumb F1 on the key operation section 5 and holds the rear surface of the device case 1 by the other fingers F2 to F5 extended from the side of the device case 1.

Furthermore, this device case 1 is formed such that the grip section 14 has a bilaterally symmetrical shape with respect to the center position of the device case 1 in the lateral direction, as shown in FIG. 1 to FIG. 5. As a result, this device case 1 is structured such that the user can grip the grip section 14 by the right hand or the left hand in a similar manner.

Figure 9:
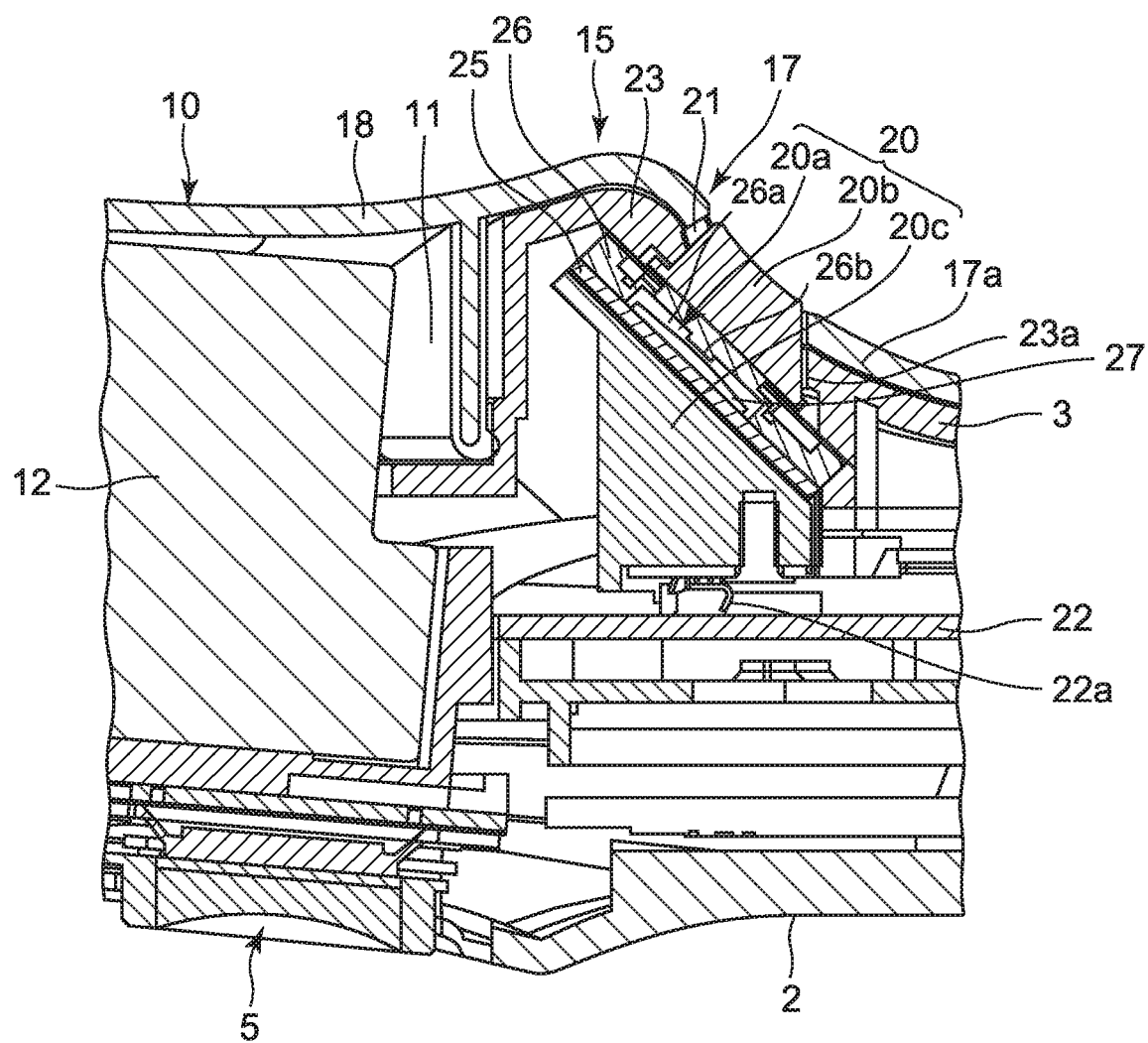
FIG. 9 is an enlarged cross sectional view of a lower surface trigger key of the portable terminal shown in FIG. 5.
Figure 10:
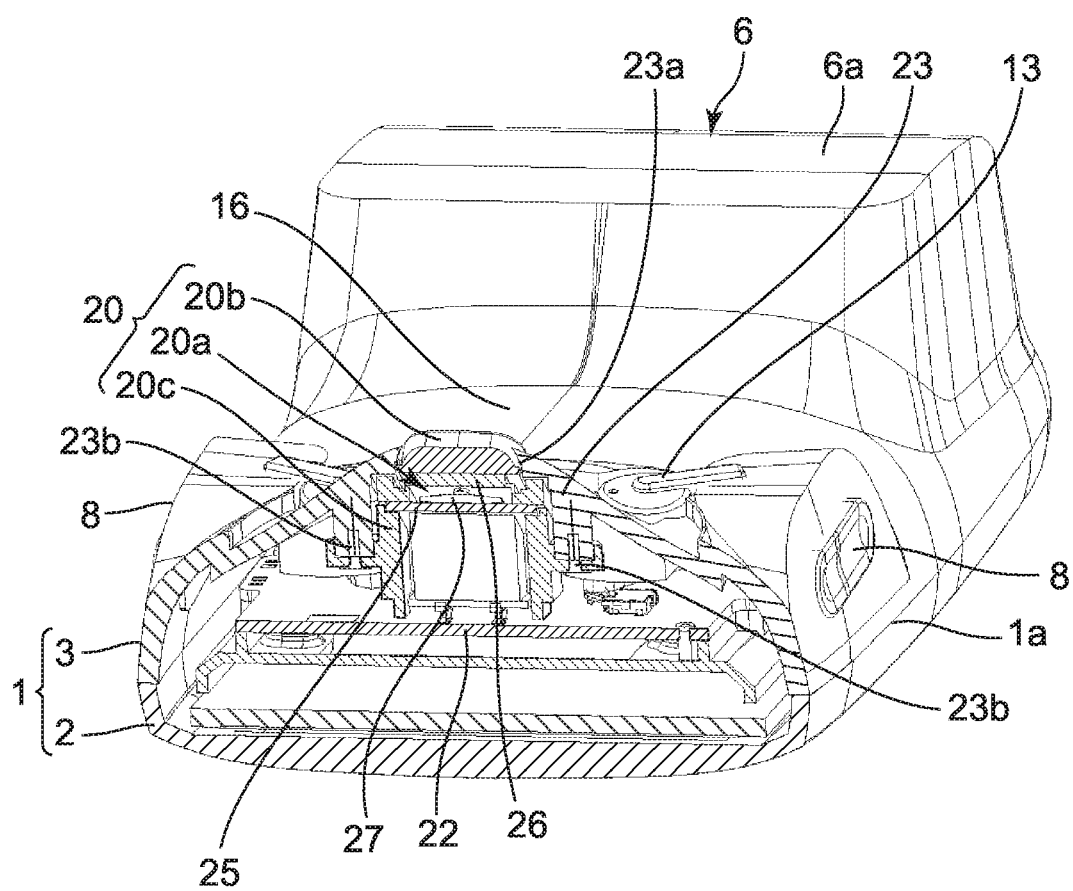
FIG. 10 is an enlarged perspective view of a cross section the portable terminal taken along line C-C in FIG. 6.

The battery cover 10 extends from the end of the lower side of the battery accommodating section 11 toward the pair of attachment levers 13 provided on the rear surface of the lower case 3 across the first finger rest area 17 of the raised portion 15, as shown in FIG. 5, FIG. 9 and FIG. 10. That is, this battery cover 10 is formed such that its portion 17a extended toward the pair of attachment levers 13 is positioned across the lower surface trigger key 20 described further below.

Also, this battery cover 10 is structured such that the first finger rest area 17 of the raised portion 15 and the extended portion 17a are held by the rear surface of a cover holding section 23 provided to the lower case 3, as shown in FIG. 5, FIG. 9 and FIG. 10. This cover holding section 23 is raised and formed in a shape similar to that of the first finger rest area 17.

Inside this cover holding section 23, the lower surface trigger key 20 is provided, as shown in FIG. 5, FIG. 9 and FIG. 10. As with the upper surface trigger key 5a of the key operation section 5 and the side trigger keys 8, this lower surface trigger key 20 is to cause a reading operation by the optical reading section 6 to be performed, as shown in FIG. 5. This lower surface trigger key 20 includes a switch main body 20a, an operation button 20b, and a switch holding section 20c.

That is, the switch holding section 20c of this lower surface trigger key 20 is attached via a screw 23b to the inner surface of the cover holding section 23 with it being arranged in the cover holding section 23 corresponding to the first finger rest area 17, as shown in FIG. 5, FIG. 9 and FIG. 10. The switch main body 20a is held in the switch holding section 20c sloped in parallel to the sloped surface of the first finger rest area 17 of the raised portion 15.

This switch main body 20a includes a switch board 25, a rubber sheet 26 and a spring member 27, as shown in FIG. 9 and FIG. 10. The switch board 25 has a pair of contacts (not shown) provided on its surface, and is arranged in the switch holding section 20c with it being sloped in parallel to the sloped surface of the first finger rest area 17. This switch board 25 is electrically connected via a flexible wiring sheet 22a to a circuit board 22 provided in the broad portion 1a of the device case 1.

The rubber sheet 26 is arranged on the switch board 25, as shown in FIG. 9 and FIG. 10. In this rubber sheet 26, a recess 26a is provided on a surface opposed to the switch board 25, and a protrusion 26b is provided in this recess 26a so as to correspond to the contacts of the switch board 25. This rubber sheet 26 is structured such that a portion corresponding to the recess 26a is elastically deformed when pressed by the operation button 20b that is a pressing target portion and the protrusion 26b is displaced toward the contacts of the switch board 25.

The spring member 27 is a substantially circular disc spring, and is arranged between the switch board 25 and the rubber sheet 26, as shown in FIG. 9 and FIG. 10. This spring member 27 is arranged on the switch board 25 with the disc spring being turned upside down, that is, with the outer circumferential edge of the front surface of the disc spring being arranged on the switch board 25 and the center of the front surface of the disc spring being isolated from the contacts of the switch board 25.

As a result, the spring member 27 is structured as follows. That is when the rubber sheet 26 is pressed by the operation button 20b to cause the portion corresponding to the recess 26a of the rubber sheet 26 to be elastically deformed, the spring member 27 is pressed by the protrusion 26b of the rubber sheet 26 to be elastically deformed, and comes in contact with the contacts of the switch board 25 for continuity of the contacts, as shown in FIG. 9 and FIG. 10.

Also, the spring member 27 is structured as follows That is, when pressed by the protrusion 26b of the rubber sheet 26 for continuity of the contacts of the switch board 25, the spring board 27 is suddenly elastically deformed to give a click feeling to the index finger F2 of the gripping hand of the user, as shown in FIG. 9 and FIG. 10. As a result, the spring member 27 is structured such that, by the click feeling given to the index finger F2 of the gripping hand of the user, the user is notified of continuity of the contacts of the switch board 25 for causing the switch main body 20a to enter an ON state.

The operation button 20b, which is a pressing target portion, is provided to the switch main body 20a with it being sloped in parallel to the sloped surface of the first finger rest area 17, and is arranged in a button insertion hole 21 provided in the first finger rest area 17 of the battery cover 10 through a button hale 23a provided in the cover holding section 23 as shown in FIG. 5, FIG. 9 and FIG. 10. As a result, the operation button 20b is structured to cause the switch main body 20a to perform an ON operation with a click feeling when a pressing operation is performed from outside the device case 1.

That is, this operation button 20b is structured to be pushed toward the inside of the cover holding section 23 when pressed in a direction substantially orthogonal to the sloped surface of the first finger rest area 17 to cause the spring member 27 to be elastically deformed via the rubber sheet 26, and thereby cause the switch main body 20a to perform an ON operation, as shown in FIG. 5 and FIG. 9. In the present embodiment, the operation button 20b is arranged to be slightly recessed in the button insertion hole 21 of the first finger rest area 17, in a state that the pressing target surface of the operation button 20b does not project to the outside of the device case 1.

Accordingly, the lower surface trigger key 20 is structured such that the operation button 20b is not pressed by the pulp of the index finger F2 and the switch main body 20a does not perform an ON operation even if the pulp of the index finger F2 of the hand of the user gripping the grip section 14 is pressed onto the first finger rest area 17 along its curve with the index finger F2 being in a bent shape and, in this state, the raised portion 15 is pulled toward the lower side of the device case 1, that is, toward the hand of the user gripping the grip section 14, when the user grips the grip section 14 of the device case 1 by one hand, as shown in FIG. 5, FIG. 9 and FIG. 10.

Also, the lower surface trigger key 20 is structured such that, in the pressing state in which the user grips the grip section 14 of the device case 1 by one hand and presses the pulp of the index finger F2 of the hand gripping the grip section 14 along the curve of the first finger rest area 17 with the index finger F2 being in a bent shape, when the pulp of the index finger F2 pulls the raised portion 15 toward the lower side of the device case 1, that is toward the hand of the user gripping the grip section 14, and is strongly pushed into the button insertion hole 21, the operation button 20b is pushed by the pulp of the index finger F2 to cause the switch main body 20a to perform an ON operation, as shown in FIG. 5, FIG. 9 and FIG. 10.

On the other hand, the battery cover 10 is structured to open or close the opening 11a of the battery accommodating section 11 by rotating this fulcrum projection portion 10a provided at an end corresponding to the lower side of the device case 1 as a fulcrum, as shown in FIG. 5 to FIG. 8. In the present embodiment, the button insertion hole 21 of the battery cover 10 and the operation button 20b that is a button section of the lower surface trigger key 20 are each formed in a shape by which the inner peripheral surface of the button insertion hole 21 and the outer peripheral portion of the operation button 20b do not come in contact with each other when the battery cover 10 is opened or closed by being rotated with the fulcrum projection portion 10a as a fulcrum.

The lower surface trigger key 20 is set to require operating force different from that required for each of the keys of the key operation section 5, the upper surface trigger key 5a of this key operation section 5, and the side trigger keys B shown in FIG. 1 to FIG. 4. That is, the lower surface trigger key 20 is set such that a state where the operation button 20b has been slightly recessed in the button insertion hole 21 of the battery cover 10, or in other words, its recessed state or its projecting state is different, whereby strong operating force is required which is different from that for each of the keys of the key operation section 5, the upper surface trigger key 5a of this key operation section 5, and the side trigger keys 8, as shown in FIG. 9.

Also, this lower surface trigger key 20 is set such that its operation load is heavier than the operation load of each of the keys of the key operation section 5, the upper surface trigger key 5a of this key operation section 5, and the side trigger keys 8 shown in FIG. 1 to FIG. 4. That is, by the spring force of the spring member 27 of the switch main body 20a, this lower surface trigger key 20 is set such that its operation load is heavier than the operation load of each of the keys of the key operation section 5, the upper surface trigger key 5a of this key operation section 5, and the side trigger keys 8, as shown in FIG. 9.

Furthermore, this lower surface trigger key 20 is set such that a click feeling that is given when the lower surface trigger key 20 is subjected to a switch operation to enter an ON state is greater than that of each of the keys of the key operation section 5, the upper surface trigger key 5a of this key operation section 5, and the side trigger keys 8 shown in FIG. 1 to FIG. 4. That is, this lower surface trigger key 20 is structured such that the spring member 27 that is a dish spring of the switch main body 20a is suddenly elastically deformed when the lower surface trigger key 20 is subjected to a switch operation to enter an ON state, and gives a click feeling to the index finger F2 of the gripping hand of the user, as shown in FIG. 9.

Accordingly, the lower surface trigger key 20 is set such that the spring member 27 that is a dish spring of the switch main body 20a is suddenly elastically deformed when the lower surface trigger key 20 is subjected to a switch operation to enter an ON state, whereby a click feeling greater than that of each of the keys of the key operation section 5, the upper surface trigger key 5a of this key operation section 5, and the side trigger keys 8 is given to the index finger F2 of the gripping hand of the user, as shown in FIG. 9.

Next, the mechanism of this portable terminal is described.

To use this portable terminal, the user first attaches the battery cover 10 to the rear surface of the device case 1 to cover the opening 11a of the battery accommodating section 11 provided to the narrow portion 1b of the device case 1. Here, the end on the lower side of the battery cover 10 is attached to the inner edge portion on the lower side of the battery accommodating section 11 and, with the fulcrum projection portion 10a at the end of this attached battery cover 10 as a fulcrum, the battery cover 10 is rotated to cause the upper side of the battery cover 10 to be placed on the cover holding section 23 of the lower case 3.

As a result, the extended portion 17a of the first finger rest area 17 of the battery cover 10 is arranged on the cover holding section 23 of the lower case 3 across the lower surface trigger key 20. Here, since the button insertion hole 21 provided in the battery cover 10 corresponds to the button hole 23a of the cover holding section 23, the above-described operation causes the operation button 20b of the lower surface trigger key 20 to be relatively inserted into the button insertion hole 21 of the battery cover 10 via this button hole 23a. Here, the inner periphery portion of the button insertion hole 21 of the battery cover 10 is favorably inserted without coming in contact with the outer periphery portion of the operation button 20b.

Also, here, the edge of the upper side of the battery cover 10 corresponds to the pair of attachment levers 13 provided on the rear surface of the lower case 3. Accordingly, by the user rotating the pair of these attachment levers 13, the edge of the upper side of the battery cover 10 is pressed onto and engaged with the rear surface of the lower case 3 by the pair of attachment levers 13. As a result, the battery cover 10 covers the opening 11a of the battery accommodating section 11 and is attached to the rear surface of the lower case 3 across the lower surface trigger key 20.

To use this portable terminal as described above, the user holds the device case 1 by gripping the grip section 14 at the position of the battery cover 10 by one hand. That is, the user grips the grip section 14 by one hand in the gripping style where the user places the thumb F1 on the key operation section 5 so as to operate the key operation section 5 by the thumb F1 and holds the rear surface of the device case 1 by the other fingers F2 to F5 extended from the side of the device case 1.

Here, the thumb F1 is placed above the key operation section 5 on the front surface of the device case 1, and the vertex portion 15a of the raised portion 15 having a bulging shape is arranged between the index finger F2 and the middle finger F3 of the hand of the user gripping the grip section 14. In this state, the pulp of the index finger F2 is pressed onto the first finger rest area 17 in the raised portion 15 of the battery cover 10 positioned on the rear surface side of the device case 1, and the pulp of each of the other fingers F3 to F5 is placed on the second finger rest area 18 of the raised portion 15.

In this state, in the gripping style where the user places the thumb F1 on the key operation section 5 so as to operate the key operation section 5 by the thumb F1 and holds the rear surface of the device case 1 by the other fingers F2 to F5 extended from the side of the device case 1, the pulp of the index finger F2 of the hand of the user gripping the grip section 14 is pressed onto the sloped surface of the first finger rest area 17 in the raised portion 15 of the battery cover 10 and, in this state, the index finger F2 of the gripping hand is pulled so that the first finger rest area 17 is pulled toward the lower side of the raised portion 15, that is, toward the hand of the user gripping the grip section 14.

In the present embodiment when the pulp of the index finger F2 is pressed onto the sloped surface of the first finger rest area 17 in the raised portion 15 of the battery cover 10 and is pulled toward the lower side of the device case 1, that is, toward the hand of the user gripping the grip section 14, the index finger F2 is naturally flexed and pressed along the first finger rest area 17.

Here, even when the index finger F2 of the hand of the user gripping the grip section 14 is pressed onto the first finger rest area 17 along its curve with it being in a bent shape, the pulp of the index finger F2 is not deeply pressed into the button insertion hole 21 in the first finger rest area 17. Accordingly, the operation button 20b is not pushed by the pulp of the index finger F2, and the switch main body 20a does not perform an ON operation.

Also, here, in the gripping style where the user places the thumb F1 on the key operation section 5 so as to operate the key operation section 5 by the thumb F1 and holds the rear surface of the device case 1 by the other fingers F2 to F5 extended from the side of the device case 1, the pulp of each of the other fingers F3 to F5 of the hand of the user gripping the grip section 14 is pressed onto the second finger rest area 18 of the raised portion 15. In this state, the fingers F3 to F5 are placed with them being naturally flexed along the curved surface of the second finger rest area 18.

That is, with the vertex portion 15a of the raised portion 15 being arranged between the index finger F2 and the middle finger F3 of the gripping hand of the user, the middle finger F3 to the small finger F5 are placed so as to be aligned in the second finger rest area 18 with them being naturally flexed to wrap the second finger rest area 18 of the raised portion 15. Accordingly, the fingers F3 to F5 are favorably and stably placed along the curved surface of the second finger rest area 18. This allows the user to reliably and favorably grip the grip section 14 of the device case 1 by one hand.

As described above, the grip section 14 is provided to the narrow portion 1b of the device case 1, and has a curved shape projecting to be mildly curved from both sides toward the rear surface of the grip section 14. As a result, when the user grips the grip section 14 of the device case 1, the user can reliably and favorably grip the grip section 14 of the device case 1 by the hand gripping the grip section 14. Also, the user can fit the hand gripping the grip section 14 to the grip section 14.

Also, the grip section 14 is formed in a bilaterally symmetrical shape with respect to the center position of the device case 1 in the lateral direction. Therefore, when the user grips the grip section 14 of the device case 1 by one hand, the grip section 14 of the device case 1 can be reliably and favorably gripped by the right hand or the left hand of the user. Here, by the lower surface of the grip section 14 being formed in a curved shape mildly curved to project, the gripping hand of the user fits the grip section 14 when the user grips the grip section 14 of the device case 1 by one hand.

When the user grips the grip section 14 of the device case 1 as described above, the thumb F1 is placed above the key operation section 5 without obstructing the display section 4, so that the user can favorably perform key operations on the key operation section 5 by freely moving the thumb F1 above the key operation section 5 while viewing information displayed on the display section 4.

Also, when the user grips the grip section 14 of the device case 1, the index finger F2 is placed on the sloped surface of the first finger rest area 17 of the raised portion 15. Therefore, the index finger F2 of the gripping hand of the user is placed on the operation button 20b of the lower surface trigger key 20 inserted into the button insertion hole 21 provided in the sloped surface of this first finger rest area 17 and, in this state, the user can easily operate, by using the index finger F2, the operation button 20b of the lower surface trigger key 20.

That is, when the user grips the grip section 14 of the device case 1 by one hand, the user presses the pulp of the index finger F2 of the hand gripping the grip section 14 onto the first finger rest area 17 along its curve with the index finger F2 being in a bent shape, and can strongly push the pulp of the index finger F2 of the gripping hand of the user while pulling the raised portion 15 toward its lower side, that is, toward the hand of the user gripping the grip section 14.

Here, when the operation button 20b of the lower surface trigger key 20 is pushed by the pulp of the index finger F2, the protrusion 26b of the rubber sheet 26 of the switch main body 20a presses the spring member 27, so that the spring member 27 is suddenly elastically deformed, gives a click feeling to the index finger F2 of the hand of the user gripping the gripping section 14, and comes in contact with the contacts of the switch board 25 for continuity of the contacts. As a result, the switch main body 20a of the lower surface trigger key 20 performs an ON operation.

Here, the lower surface trigger key 20 is set to require operating force different from that required for each of the keys of the key operation section 5, the upper surface trigger key 5a, and the side trigger keys 8. Accordingly, by the difference between the operation feeling of each of the keys of the key operation section 5, the upper surface trigger key 5a, and the side trigger keys 8 and the operation feeling of the lower surface trigger key 20, erroneous operations on the lower surface trigger key 20 and the other keys can be prevented.

That is, in this lower surface trigger key 20, the operation button 20b is arranged to be slightly recessed in the button insertion hole 21 of the battery cover 10 and, by the spring force of the spring member 27 of the switch main body 20a, the operation load is set heavier than the operation load of each of the keys of the key operation section 5, the upper surface trigger key 5a, and the side trigger keys 8. Accordingly, the operation load of the lower surface trigger key 20 is heavier than the operation load of each of the keys of the key operation section 5, the upper surface trigger key 5a, and the side trigger keys 8. Accordingly, by the difference in operation load, erroneous operations on the lower surface trigger key 20 and the other keys can be prevented.

Also, in the lower surface trigger key 20, a click feeling to be given to the index finger F2 of the user when the operation button 20b is pressed to cause the switch main body 20a to perform an ON operation is stronger than the click feeling of each of the keys of the key operation section 5, the upper surface trigger key 5a, and the side trigger keys 8. Accordingly, by the difference in click feeling, erroneous operations on the lower surface trigger key 20 and the other keys can be prevented.

When the lower surface trigger key 20 performs an ON operation as described above, the optical reading section 6 provided on the rear surface of the broad portion 1a of the device case 1 is driven to cause the laser reading section to emit a laser beam from the first window section 6b of the read projecting portion 6a to the outside of the device case 1, and receives a reflected light of the laser beam so as to read, for example, a barcode of an article. Also, here, through the second window section 6c, the imaging section of the optical reading section 6 captures an image of for example, an article from which its barcode is to be read.

As described above, this portable terminal includes the grip section 14 capable of being gripped by a hand of the user in the predetermined gripping style, the lower surface trigger key 20 that is a first switch section provided such that at least the operation button 20b that is a pressing target portion is exposed from the rear surface of the device case 1 serving as the terminal main body and capable of being operated by the index finger F2 of the user gripping the grip section 14 in the gripping style, and the upper surface trigger key 5a that is a second switch section provided such that at least a pressing target portion is exposed from the front surface of the device case 1 and capable of being operated by the thumb F1 of the gripping hand of the user in the gripping style. The operating force required for the pressing target portion of the lower surface trigger key 20 is set higher than that of the upper surface trigger key 5a Therefore, erroneous operations can be prevented by the difference in operation feeling between the upper surface trigger key 5a and the lower surface trigger key 20.

Also, this portable terminal has the side trigger keys 8 provided on both side of the device case 1 such that at least each pressing target portion is exposed from the side surface of the device case 1 serving as the terminal main body. This portable terminal includes the grip section 14 capable of being gripped by one hand of the user in the gripping style where the user places the thumb F1 on the front surface of the device case 1 and holds the rear surface of the device case 1 by at least the index finger F2 and the middle finger F3 extended from the side of the device case 1, and the lower surface trigger key 20 provided such that the pressing target portion is exposed from the rear surface of the device case 1 and capable of being operated by the index finger F2 of the one hand in the gripping style. The operating force required for the pressing target portion of the lower surface trigger key 20 is set greater than that of the side trigger keys 8. Therefore, erroneous operations can be prevented by the difference in operation feeling between the side trigger keys 8 and the lower surface trigger key 20.

Also, this portable terminal has the key operation section 5 including front surface switches provided on the front surface of the device case 1 such that at least pressing target portions are exposed from the front surface of the device case 1 serving as the terminal main body. This portable terminal includes the grip section 14 capable of being gripped by one hand of the user in the gripping style where the user places the thumb F1 on the front surface of the device case 1 and holds the rear surface of the device case 1 by at least the index finger F2 and the middle finger F3 extended from the side of the device case 1, and the lower surface trigger key 20 provided such that the pressing target portion is exposed from the rear surface of the device case 1 and capable of being operated by the index finger F2 of the one hand in the gripping style. The operating force required for the pressing target portion of the lower surface trigger key 20 is set greater than that of each of the plurality of keys of the key operation section 5. Therefore, erroneous operations can be prevented by the difference in operation feeling between the plurality of keys of the operation key section 5 and the lower surface trigger key 20.

Here, this portable terminal has the first finger rest area 17 provided projecting on the rear surface of the grip section 14. In the first finger rest area, the index finger F2 of the hand of the user gripping the gripping section 14 is placed when the user grips the device case 1 by placing the thumb F1 on the front surface of the grip section 14 of the device case 1 and gripping the device case 1 from the side by one hand. Also, the lower surface trigger key 20 is provided corresponding to the sloped surface of the first finger rest area 17. Therefore, the lower surface trigger key 20 can be easily operated by the index finger F2 of the user.

That is in this portable terminal, when the user grips the grip section 14 of the device case 1 by one hand, the pulp of the index finger F2 is pressed onto the first finger rest area 17 along its curve with the index finger F2 of the hand of the user gripping the grip section 14 being in a bent shape, and the pulp of the index finger F2 of the gripping hand of the user can be strongly pushed into the button insertion hole 21 with the raised portion 15 of the device case 1 being pulled toward the lower side, that is, toward the hand of the user gripping the grip section 14. Therefore, the lower surface trigger key 20 can be easily operated by the index finger F2 of the user.

Also, this portable terminal is structured such that the projecting state or recessed state of the operation button 20b that is the pressing target portion of the lower surface trigger key 20 is set to be different from those of the upper surface trigger key 5a, the side trigger keys 8, and the plurality of keys of the key operation section 5, whereby the required operating force of the lower surface trigger key 20 is set different from that of each of the other keys. Accordingly, by the difference in operation feeling between the lower surface trigger key 20 and the other keys, erroneous operations on the lower surface trigger key 20 and the other keys can be prevented.

Accordingly, in this portable terminal, when the user 19 operating the keys of the operation key section 5, the upper surface trigger key 5a, and the side trigger keys 8 by the thumb F1 while gripping the device case 1 by one hand gripping from the side of the key operation section 5 in a manner to place the thumb F1 on the key operation section 5 and pressing the index finger F2 of the hand gripping the grip section 14 onto the first finger rest area 17 of the battery cover 10, the operation feeling of the above-described keys is different from that of the lower surface trigger key 20. Therefore, erroneous operations on the lower surface trigger key 20 and the other keys can be prevented.

Also, this portable terminal is structured such that the operation load required for the operation button 20b that is the pressing target portion of the lower surface trigger key 20 is set different from those of the upper surface trigger key 5a, the side trigger keys 8, and the plurality of keys of the key operation section 5, whereby the operation feeling of the lower surface trigger key 20 is set different from that of the other keys. Accordingly, by the difference in operation load between the lower surface trigger key 20 and the other keys, erroneous operations on the lower surface trigger key 20 and the other keys can be prevented.

That is, in this portable terminal, the switch main body 20a of the lower surface trigger key 20 includes the switch board 25, the rubber sheet 26, and the spring member 27. Therefore, the operation load of the lower surface trigger key 20 can be set to be heavier than those of the keys of the key operation section 5, the upper surface trigger key 5a, the side trigger keys 8 when the operation button 20b of the lower surface trigger key 20 is pressed to cause the rubber sheet 26 to press the spring member 27.

Also, this portable terminal is structured such that the required click feeling occurring in the operation button 20b that is the pressing target portion of the lower surface trigger key 20 is set different from those of the upper surface trigger key 5a, the side trigger keys 8, and the plurality of keys of the key operation section 5 so as to make the operation feeling of the lower surface trigger key 20 different from that of the other keys. Accordingly, by the difference in click feeling between the lower surface trigger key 20 and the other keys erroneous operations on the lower surface trigger key 20 and the other keys can be prevented.

That is, the click feeling of the lower surface trigger key 20 that is given to the index finger F2 of the user when the lower surface trigger key 20 is subjected to a key operation to enter an ON state is set greater than those of the keys of the key operation section 5, the upper surface trigger key 5a, and the side trigger keys 8 given to the thumb F1 of the user. Accordingly, by the difference in click feeling between the lower surface trigger key 20 and the other keys erroneous operations on the lower surface trigger key 20 and the other keys can be prevented.

In the above-described embodiment the lower surface trigger key 20 is provided with it being recessed in the button insertion hole 21 of the battery cover 10, whereby the lower surface trigger key 20 is set such that operating force stronger than those for the keys of the key operation section 5, the upper surface trigger key 5a, and the side trigger keys 8 is required. However, the present invention is not limited thereto. In the present invention, the operation stroke of the lower surface trigger key 20 may be set longer than those of the keys of the key operation section 5, the upper surface trigger key 5a, and the side trigger keys 8.

In this structure as well, the operation stroke when the user operates the keys of the key operation section 5, the upper surface trigger key 5a, and the side trigger keys by the thumb F1 with the index finger F2 of the gripping band being pressed onto the first finger rest area 17 of the battery cover 10 is different from the operation stroke when the user operates the lower surface trigger key 20 by the index finger F2 of the gripping hand as with the above-described embodiment. Therefore, by the difference in operation stroke between the lower surface trigger key 20 and the other keys, erroneous operations on the lower surface trigger key 20 and the other keys can be prevented.

Also, in the above-described embodiment, the display section 4 and the key operation section 5 are provided on the front surface of the device case 1. However, the present invention is not limited thereto. For example, the key operation section 5 may be an input display section formed of a transparent touch panel and having a display panel laminated thereon.

While the present invention has been described with reference to the preferred embodiments, it is intended that the invention be not limited by any of the details of the description therein but includes all the embodiments which fall within the scope of the appended claims.

What is claimed is:

1. A portable terminal comprising:
   a terminal main body having a first end and a second end at opposite ends thereof in a longitudinal direction of the terminal main body and a front side and a back side at opposite sides thereof in a front-back direction which is orthogonal to the longitudinal direction, the terminal main body comprising a first portion that includes the first end and a second portion that includes the second end;
   a grip section provided at the second portion of the terminal main body and configured to be gripped by a hand of a user;
   a display provided at the first portion on the front side of the terminal main body;
   a first switch provided on the back side of the terminal main body, the first switch comprising a pressing target that is exposed at the back side of the terminal main body and is configured to be operated by an index finger of the hand of the user gripping the grip section; and
   a second switch provided at the second portion on the front side of the terminal main body, the second switch being provided separately from the display at a position between the display and the second end of the terminal main body, and the second switch comprising a pressing target that is exposed at the front side of the terminal main body and is configured to be operated by a thumb of the hand of the user gripping the gripping section,
   wherein the pressing target of the first switch is configured to require an operating force that is greater than an operating force required by the pressing target of the second switch.

2. The portable terminal according to claim 1, wherein a projecting state or a recessed state of the pressing target of the first switch is different from a projecting state or a recessed state of the pressing target of the second switch, such that the operating force required by the pressing target of the first switch is greater than the operating force required by the pressing target of the second switch.

3. The portable terminal according to claim 1, wherein an operation load required for the pressing target of the first switch is different from an operation load required for the pressing target of the second switch, such that the operating force required by the pressing target of the first switch is greater than the operating force required by the pressing target of the second switch.

4. The portable terminal according to claim 1, wherein an operation stroke required for the pressing target of the first switch is different from an operation stroke required for the pressing target of the second switch, such that the operating force required by the pressing target of the first switch is greater than the operating force required by the pressing target of the second switch.

5. The portable terminal according to claim 1, wherein the pressing target of the first switch is configured to provide a click feeling upon operation that is different from a click feeling provided by the pressing target of the second switch.

6. The portable terminal according to claim 1, wherein the pressing target of the first switch does not project from a surface of the back side of the terminal main body that surrounds the pressing target of the first switch.

7. The portable terminal according to claim 1, wherein the pressing target of the second switch projects from a surface of the front side of the terminal main body that surrounds the pressing target of the second switch, and
   wherein the pressing target of the first switch does not project from a surface of the back side of the terminal main body that surrounds the pressing target of the first switch.

8. A portable terminal comprising:
   a terminal main body having a first end and a second end at opposite ends thereof in a longitudinal direction of the terminal main body, a front side and a back side at opposite sides thereof in a front-back direction which is orthogonal to the longitudinal direction, and two lateral sides provided at opposite sides thereof in a lateral direction which is orthogonal to both the longitudinal direction and the front-back direction;

a grip section provided adjacent to the second end of the terminal main body and configured to be gripped by one hand of a user in a gripping style in which the user places a thumb of the one hand on the front side of the terminal main body and holds the rear side of the terminal main body by at least an index finger and a middle finger extended one of the lateral sides of the terminal main body;

side switches provided respectively on the two lateral sides of the terminal main body, each of the side switching comprising a pressing target that is exposed on one of the lateral sides of the terminal main body; and a lower surface switch including a pressing target that is exposed on the back side of the terminal main body, wherein the lower surface switch is a trigger switch and the pressing target thereof is a trigger key which is configured to be operated by the index finger of the one hand while the user grips the gripping section in the gripping style, and wherein the pressing target of the lower surface switch is configured to require an operating force that is greater than an operating force required by the pressing target of each of the side switches.

9. The portable terminal according to claim 8, wherein a projecting state or a recessed state of the pressing target of each of the side switches is different from a projecting state or a recessed state of the pressing target of the lower surface switch, such that the operating force required by the pressing target of the lower surface switch is greater than the operating force required by the pressing target of each of the side switches.

10. The portable terminal according to claim 8, wherein an operation load required for the pressing target of each of the side switches is different from an operation load required for the pressing target of the lower surface switch, such that the operating force required by the pressing target of the lower surface switch is greater than the operating force required by the pressing target of each of the side switches.

11. The portable terminal according to claim 8, wherein an operation stroke required for the pressing target of each of the side switches is different from an operation stroke required for the pressing target of the lower surface switch, such that the operating force required by the pressing target of the lower surface switch is greater than the operating force required by the pressing target of each of the side switches.

12. The portable terminal according to claim 8, wherein the pressing target of each of the side switches is configured to provide a click feeling upon operation that is different from a click feeling provided by the pressing target of the lower surface switch.

13. The portable terminal according to claim 8, wherein the pressing target of the lower surface switch does not project from a surface of the back side of the terminal main body that surrounds the pressing target of the lower surface switch.

14. A portable terminal comprising:

a terminal main body having a first end and a second end at opposite ends thereof in a longitudinal direction of the terminal main body and a front side and a back side at opposite sides thereof in a front-back direction which is orthogonal to the longitudinal direction, the terminal main body comprising a first portion that includes the first end and a second portion that includes the second end;

a display provided at the first portion on the front side of the terminal main body;

a plurality of front surface switches provided at the second portion on the front side of the terminal main body, each of the plurality of front surface switches including a pressing target that is exposed on the front side of the terminal main body, and the plurality of front switches being provided separately from the display at positions between the display and the second end of the terminal main body;

a grip section provided at the second portion of the terminal main body and configured to be gripped by one hand of a user in a gripping style in which the user places a thumb of the one hand on the front side of the terminal main body and holds the rear side of the terminal main body by at least an index finger and a middle finger extended from a side of the terminal main body; and a lower surface switch including a pressing target that is exposed on the back side of the terminal main body and is configured to be operated by the index finger of the one hand while the user grips the gripping section in the gripping style, wherein the pressing target of the lower surface switch is configured to require an operating force that is greater than an operating force required by the pressing target of each of the plurality of front surface switches.

15. The portable terminal according to claim 14, wherein a projecting state or a recessed state of the pressing target of each of the front surface switches is different from a projecting state or a recessed state of the pressing target of the lower surface switch, such that the operating force required by the pressing target of the lower surface switch is greater than the operating force required by the pressing target of each of the plurality of front surface switches.

16. The portable terminal according to claim 14, wherein an operation load required for the pressing target of each of the front surface switches is different from an operation load required for the pressing target of the lower surface switch, such that the operating force required by the pressing target of the lower surface switch is greater than the operating force required by the pressing target of each of the plurality of front surface switches.

17. The portable terminal according to claim 14, wherein an operation stroke required for the pressing target of each of the front-surface switches is different from an operation stroke required for the pressing target of the lower surface switch, such that the operating force required by the pressing target of the lower surface switch is greater than the operating force required by the pressing target of each of the plurality of front surface switches.

18. The portable terminal according to claim 14, wherein the pressing target of each of the front-surface switches is configured to provide a click feeling upon operation that is different from a click feeling provided the pressing target of the lower surface switch.

19. The portable terminal according to claim 14, wherein the pressing target of the lower surface switch does not project from a surface of the back side of the terminal main body that surrounds the pressing target of the lower surface switch.

20. The portable terminal according to claim 14, wherein the pressing target of each of the plurality of front surface switches projects from a surface of the front side of the terminal main body that surrounds the pressing target of each of the plurality of front surface switches, and wherein the pressing target of the lower surface switch does not project from a surface of the back side of the terminal main body that surrounds the pressing target of the lower surface switch.

* * * * *